US011670121B2

(12) United States Patent
Jackson

(10) Patent No.: US 11,670,121 B2
(45) Date of Patent: *Jun. 6, 2023

(54) SYSTEMS AND METHODS FOR MONITORING AND REPORTING ROAD QUALITY

(71) Applicant: GOOGLE LLC, Mountain View, CA (US)

(72) Inventor: Dean K. Jackson, Pittsburgh, PA (US)

(73) Assignee: GOOGLE LLC, Mountain View, CA (US)

( * ) Notice: Subject to any disclaimer, the term of this patent is extended or adjusted under 35 U.S.C. 154(b) by 143 days.

This patent is subject to a terminal disclaimer.

(21) Appl. No.: 17/197,000

(22) Filed: Mar. 9, 2021

(65) Prior Publication Data

US 2021/0225098 A1   Jul. 22, 2021

Related U.S. Application Data

(63) Continuation of application No. 16/160,892, filed on Oct. 15, 2018, now abandoned, which is a
(Continued)

(51) Int. Cl.
*G07C 5/08*   (2006.01)
*B60W 40/06*   (2012.01)
(Continued)

(52) U.S. Cl.
CPC .......... *G07C 5/0816* (2013.01); *B60W 40/06* (2013.01); *B60W 50/04* (2013.01); *G07C 5/008* (2013.01);
(Continued)

(58) Field of Classification Search
CPC .... G07C 5/0816; G07C 5/008; G07C 5/0808; G07C 5/085; B60W 40/06; B60W 50/04; H04L 67/12
See application file for complete search history.

(56) References Cited

U.S. PATENT DOCUMENTS 6,487,477 B1   11/2002   Woestman et al.
7,512,487 B1    3/2009   Golding et al.
(Continued)

FOREIGN PATENT DOCUMENTS

JP   2009-031046 A    2/2009
JP   2009-250930 A   10/2009

OTHER PUBLICATIONS

Eriksson et al., "The Pothole Patrol: Using a Mobile Sensor Network for Road Surface Monitoring," 6th Annual International Conference on Mobile Systems, Applications and Services (2008).
(Continued)

*Primary Examiner* — Manuel A Rivera Vargas
(74) *Attorney, Agent, or Firm* — Marshall, Gerstein & Borun LLP

(57) ABSTRACT

A method in a communication device equipped with an electronic circuit includes obtaining a geographic location of a vehicle in which the communication device operates; monitoring at least one sensor signal that corresponds to road quality; determining a road quality indication of the geographic location based on the at least one sensor signal; transmitting the geographic location and the road quality indication to a server; and determining, using an information received from the server, whether the road quality indication differs from an average road quality indicia for the geographic location.

20 Claims, 6 Drawing Sheets

Related U.S. Application Data continuation of application No. 14/828,096, filed on Aug. 17, 2015, now Pat. No. 10,102,694, which is a continuation of application No. 13/362,013, filed on Jan. 31, 2012, now Pat. No. 9,108,640.

(51) Int. Cl.
*H04L 67/12* (2022.01)
*G07C 5/00* (2006.01)
*B60W 50/04* (2006.01)

(52) U.S. Cl.
CPC ........... *G07C 5/085* (2013.01); *G07C 5/0808* (2013.01); *H04L 67/12* (2013.01); *B60W 2556/50* (2020.02)

(56) References Cited

U.S. PATENT DOCUMENTS

| | | |
|---|---|---|
| 7,680,749 B1 | 3/2010 | Golding et al. |
| 7,778,769 B2 | 8/2010 | Boss et al. |
| 7,865,298 B2 | 1/2011 | Macneille et al. |
| 7,925,426 B2 | 4/2011 | Koebler et al. |
| 8,589,063 B2 | 11/2013 | Trum |
| 9,108,640 B2* | 8/2015 | Jackson ............... H04L 67/12 |
| 2005/0065711 A1* | 3/2005 | Dahlgren ......... G08G 1/096775 701/117 |
| 2007/0027593 A1 | 2/2007 | Shah et al. |
| 2007/0109119 A1* | 5/2007 | Zhang .................. G01D 21/00 706/45 |
| 2007/0150171 A1 | 6/2007 | Tengler et al. |
| 2008/0030370 A1 | 2/2008 | Doyle |
| 2008/0086266 A1* | 4/2008 | Howard ............. G08G 1/0962 340/988 |
| 2008/0177436 A1 | 7/2008 | Fortson |
| 2008/0215202 A1 | 9/2008 | Breed |
| 2008/0275644 A1 | 11/2008 | Macneille et al. |
| 2009/0084173 A1 | 4/2009 | Gudat et al. |
| 2009/0099724 A1 | 4/2009 | Kranz et al. |
| 2009/0299558 A1 | 12/2009 | Hidaka |
| 2010/0121514 A1 | 5/2010 | Kato et al. |
| 2010/0138142 A1 | 6/2010 | Pease |
| 2010/0332113 A1 | 12/2010 | Tengler et al. |
| 2011/0060517 A1 | 3/2011 | Kono et al. |
| 2011/0112764 A1 | 5/2011 | Trum |
| 2011/0137508 A1 | 6/2011 | Garcia Manchado |
| 2011/0160990 A1 | 6/2011 | Mineta |
| 2011/0251782 A1 | 10/2011 | Perkins et al. |
| 2012/0004839 A1 | 1/2012 | Mizuno et al. |
| 2012/0053805 A1 | 3/2012 | Dantu |
| 2012/0053825 A1 | 3/2012 | Schunder |
| 2012/0063825 A1 | 3/2012 | Hasegawa et al. |
| 2012/0065834 A1 | 3/2012 | Senart et al. |
| 2012/0089327 A1 | 4/2012 | Miura et al. |
| 2012/0173121 A1 | 7/2012 | Willard |
| 2012/0197517 A1 | 8/2012 | Sengoku et al. |
| 2012/0203449 A1 | 8/2012 | Sengoku et al. |
| 2012/0221234 A1 | 8/2012 | Sujan et al. |
| 2012/0226435 A1 | 9/2012 | Yuasa |
| 2012/0277987 A1 | 11/2012 | Marumoto |
| 2012/0303254 A1 | 11/2012 | Kirsch et al. |
| 2013/0046458 A1 | 2/2013 | Dufournier |
| 2013/0090790 A1 | 4/2013 | Yuen et al. |
| 2013/0090821 A1 | 4/2013 | Abboud et al. |
| 2013/0231841 A1 | 9/2013 | Rothschild |

OTHER PUBLICATIONS

Mednis et al., "Real Time Pothole Detection Using Android Smartphones with Accelerometers," 2011 International Conference on Distributed Computing in Sensor Systems and Workshops (2011).
U.S. Appl. No. 13/362,013, filed Jan. 31, 2012.
U.S. Appl. No. 13/433,996, filed Mar. 29, 2012.
U.S. Appl. No. 13/913,736, filed Jun. 10, 2013.

* cited by examiner

SYSTEMS AND METHODS FOR MONITORING AND REPORTING ROAD QUALITY

CROSS-REFERENCE TO RELATED APPLICATIONS

This application is a continuation of U.S. patent application Ser. No. 16/160,892, filed Oct. 15, 2018; which is a continuation of U.S. patent application Ser. No. 14/828,096, filed Aug. 17, 2015; which is a continuation of U.S. patent application Ser. No. 13/362,013, filed Jan. 31, 2012; the entire contents which are hereby incorporated by reference for all purposes.

BACKGROUND

Statement of the Technical Field

Embodiments include computing systems and methods for determining, reporting, and updating road quality.

Description of the Related Art

The uses and applications of computers in vehicles such as automobiles are growing as manufacturers are increasingly including sophisticated diagnostic sensor networks capable of monitoring operational conditions and vehicle components, such as engine conditions, environmental conditions, fuel consumption, mileage, tire pressure, and the like. As mobile communications technology has become more widespread, automotive computing systems are available that also include network based applications including navigation, voice search, media streaming capabilities, and the like.

Systems have been developed that monitor any of the various operational conditions and vehicle components such as those listed above. On board diagnostics (OBD) standards in the automotive industry were made possible with the advent of engine computer systems in the 1980s. In the United States, the OBD-II standard specifies a 16-pin diagnostic connector that allows owners and mechanics to interface with an engine computer and access data from an engine control unit (ECU). Various sensors are also monitored by the ECU.

Diagnostic systems have been developed that utilize the 16-pin OBD-II connector to monitor various vehicle systems. In particular, a number of devices are available on the market that allow a user to read and continuously monitor various sensors and data outputs directly through the diagnostic connector. However, these systems primarily rely solely on the information provided by a single vehicle through its diagnostic connector and do not allow for data aggregation across multiple vehicles.

Additionally, systems and methods have been developed for determining road roughness using response type road roughness meters. An exemplary response type road roughness meter is the Mays Ride Meter which consists of a tow vehicle and a trailer to measure 0.1 inch increments of vertical axle movement with respect to the trailer frame. A pavement condition recorder ("PCR") is located in the tow vehicle to record all data collected which may then be processed through a data playback unit ("DPU"). Aggregating road quality information across many different routes using existing systems would require such substantial resources as to be impractical.

SUMMARY

Systems and methods for monitoring vehicle sensors to determine and report road quality using a communication device including an electronic circuit are provided. In an implementation, the communication device may be integrated into a "head unit" controlling the vehicle's radio or stereo system, and the vehicle's location on a road may be determined by a GPS-enabled head unit or similar device together with appropriate mapping software. Monitoring road quality may be achieved by adding a sensor to the shocks, by use of a vertical displacement sensor present in the head unit, or the like. Various combinations of sensors may also be employed. The signals from the sensors are monitored by an electronic circuit of the head unit and analyzed to judge the quality of the road by the amount of vertical vibration that is encountered. This data, together with the vehicle's location, may be transmitted through a mobile network to a central server for distribution in road quality reports and to improve driving directions in mapping software.

In an illustrative implementation, vehicle sensor monitoring is continuous during vehicle operation. Also provided are methods and systems for a server to receive road quality indications for a geographic location from multiple vehicles and generating an average road quality indication for the location. This average road quality indication may then be used by the head unit's electronic circuit to determine if there is a problem with one or more sensors and or to recalibrate one or more sensors.

BRIEF DESCRIPTION OF THE DRAWINGS

Embodiments will be described with reference to the following drawing figures, in which like numerals represent like items throughout the figures, and in which.

DETAILED DESCRIPTION

Figure 1:
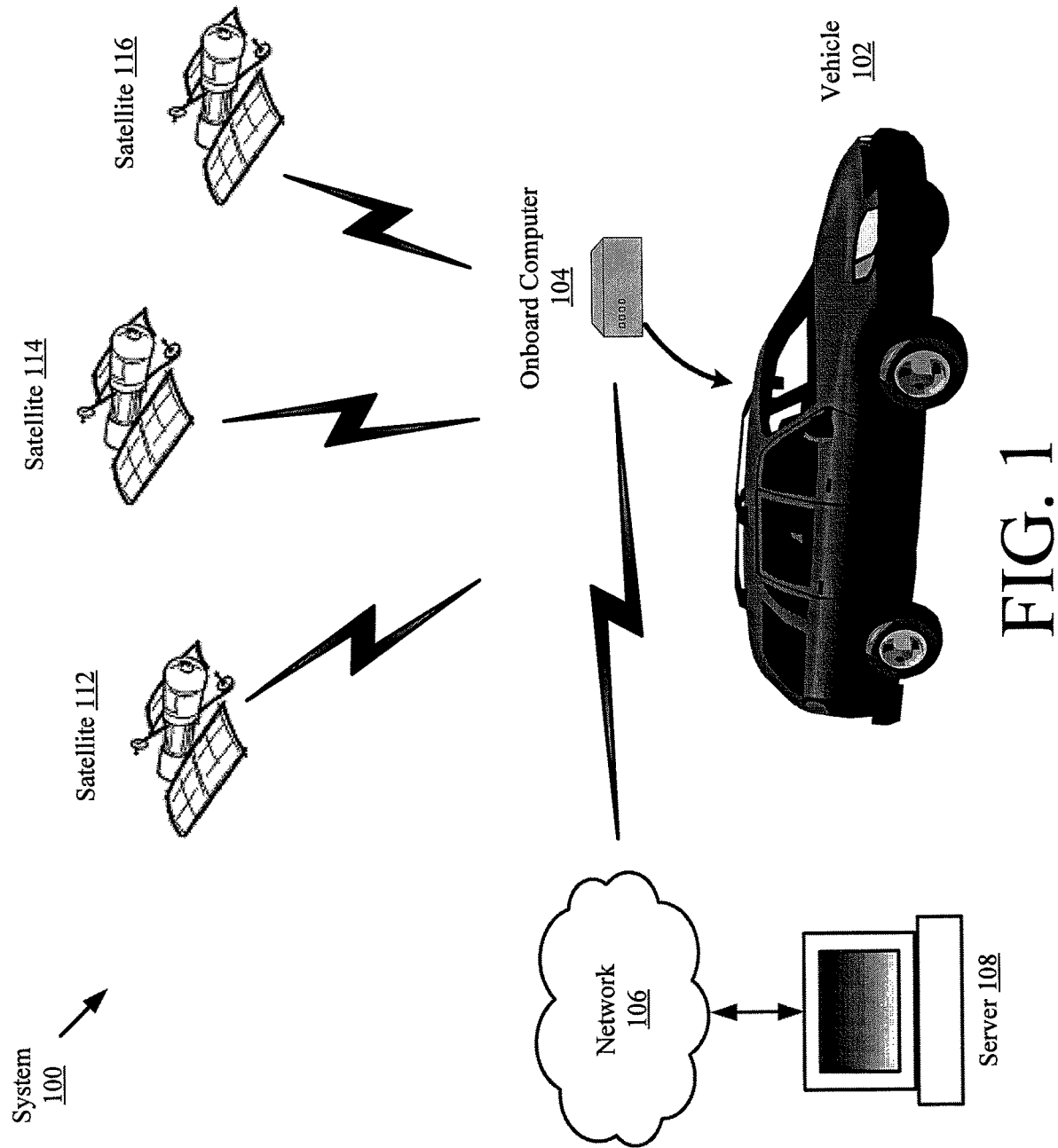
FIG. 1 is a block diagram of an exemplary automotive system.

Example implementations of the present invention are described with reference to the attached figures. The figures are not drawn to scale and they are provided merely to illustrate the instant invention. Several aspects are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is if, X employs A; X employs B; or X employs both A and B, then "X employs A or B" is satisfied under any of the foregoing instances.

Various implementations include systems and methods for monitoring vehicle sensors to determine and report road quality using a communication device. In one such implementation, the communication device may be a "head unit" controlling the vehicle's radio or stereo system, and the vehicle's location on a road may be determined by a GPS-enabled head unit or similar device together with appropriate mapping software. Monitoring road quality may be achieved by adding a sensor to the shocks, by use of a vertical displacement sensor present in the head unit, and the like. Various combinations of sensors may also be employed. The signals from the sensors are monitored by an electronic circuit of the head unit and analyzed to judge the quality of the road by the amount of vertical vibration that is encountered. This data, together with the vehicle's location, may be transmitted through a mobile network to a central server for distribution in road quality reports and to improve driving directions in mapping software.

Automotive implementations may employ other devices. Use of the term "head unit" herein is intended to also include use of alterative devices unless otherwise indicated. For example, various implementations of the present invention may use alternative devices and device applications including, but not limited to, mobile phone applications, portable computer applications, PDA applications, portable navigation device applications, as well as any other application in which vehicle setting preferences may be automatically controlled based on a position and/or identity of a person within the vehicle. Exemplary implementing system embodiments of the present invention will be described below in relation to FIGS. 1-4. Exemplary method embodiments of the present invention will be described below in relation to FIGS. 5-6.

Exemplary Systems

Referring now to FIG. 1, there is provided a block diagram of an exemplary system 100 that comprises a vehicle 102, an onboard computer 104, a network 106, a server 108 and satellites 112-116. The system 100 may include more, less or different components than those illustrated in FIG. 1. However, the components shown are sufficient to disclose an illustrative embodiment implementing the present invention.

The vehicle 102 is also configured to allow the onboard computer 104 to control and monitor various vehicle sensor systems and networks within the vehicle 102 including, but not limited to, sensors for monitoring vehicle diagnostic systems, environmental conditions within and outside the vehicle, road quality, engine tuning and performance, wind speed, and the like.

The onboard computer 104 is also configured to control and monitor various vehicle systems and networks based on information received from the server 108 via network 106. This information may include, but is not limited to, an updated road quality indication algorithm. The updated road quality indication algorithm is determined by the server 108 based at least on location data (e.g., the GPS data) and/or sensor data obtained by the onboard computer 104. The sensor data includes, but is not limited to, vertical displacement data, suspension data, time data, direction data, velocity data, and/or acceleration data. Methods for determining updated road quality indication algorithms are discussed below in reference to FIG. 6.

In an implementation, the vehicle 102 is a GPS enabled vehicle. As such, the vehicle 102 includes a GPS receiver (not shown in FIG. 1) in communication with an onboard computer 104. Various implementations may alternatively incorporate a GPS receiver with the onboard computer 104. The GPS receiver is generally configured to receive GPS signals from the satellites 112-116 and process the GPS signals to determine an estimate of the current location of the vehicle 102 on Earth. The current location of the vehicle 102 is determined by computing a difference between a time that each GPS signal is sent by a respective satellite 112-116 and a time that the GPS signal was received by the GPS receiver of the vehicle 102. The time difference is then used by the vehicle 102 to compute a distance, or range, from its GPS receiver to the respective satellite 112-116. Thereafter, the vehicle 102 computes its own two-dimensional or three-dimensional position using the computed ranges to the satellites 112-116 and a location of the satellites 112-116 when the GPS signals were sent therefrom. The multi-dimensional position is defined by GPS data specifying a direction, a latitude, a longitude, an altitude and/or a velocity.

Methods for determining updated position estimates for vehicle 102 based on GPS data or any other location based data, such as differential GPS ("DGPS") are well known in the art, and therefore will not be described in detail herein. Any such known method for determining updated location estimates can be used with the present invention without limitation.

Figure 2:
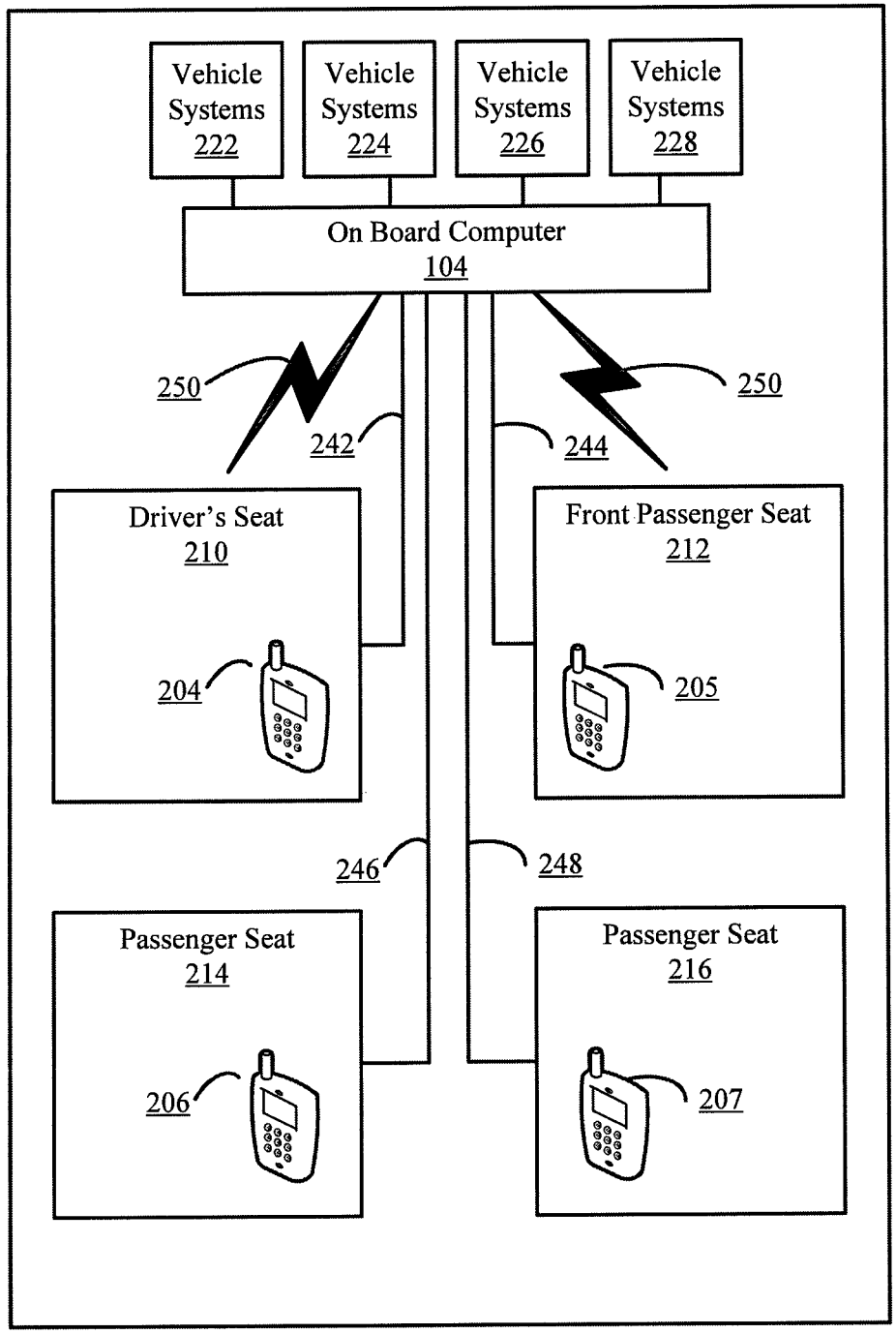
FIG. 2 is a block diagram of an exemplary automotive system.

Referring now to FIG. 2, there is provided a more detailed block diagram of the vehicle 102. The vehicle 102 will be described herein as including an onboard computer 104.

Notably, the vehicle 102 can include more or less components than those shown in FIG. 2. For example, the vehicle 102 can include a wired system interface, such as a USB interface (not depicted) to connect the onboard computer 104 with vehicle systems 222-228 and seat locations 210-216. However, the components shown are sufficient to disclose an illustrative embodiment implementing the present invention. The hardware architecture of FIG. 2 represents one embodiment of a representative vehicle configured to monitor the road quality experienced by a vehicle 102. In this regard, the vehicle of FIG. 2 implements a method for monitoring and reporting road quality. Exemplary embodiments of said method will be described below in relation to FIGS. 5-6.

Onboard computer 104 is also preferably controllably connected to vehicle systems 222-224. These systems may include, but are not limited to, engine tuning systems, suspension systems, GPS/navigation systems, and the like. Vehicle systems 222-228 may be connected through a wired connection, as shown in FIG. 2, or by other means. In one implementation, the onboard computer 104 may be connected to a sensor monitoring the activity of the suspension system. For example, one or more sensors may be used to monitor piston movement in the vehicle's shock absorbers. Alternatively, onboard computer 104 may have a vertical displacement sensor capable of measuring vertical vibration. The onboard computer may use signals generated by these sensors to make a determination of the road quality of the route the vehicle is currently traveling.

Figure 3:
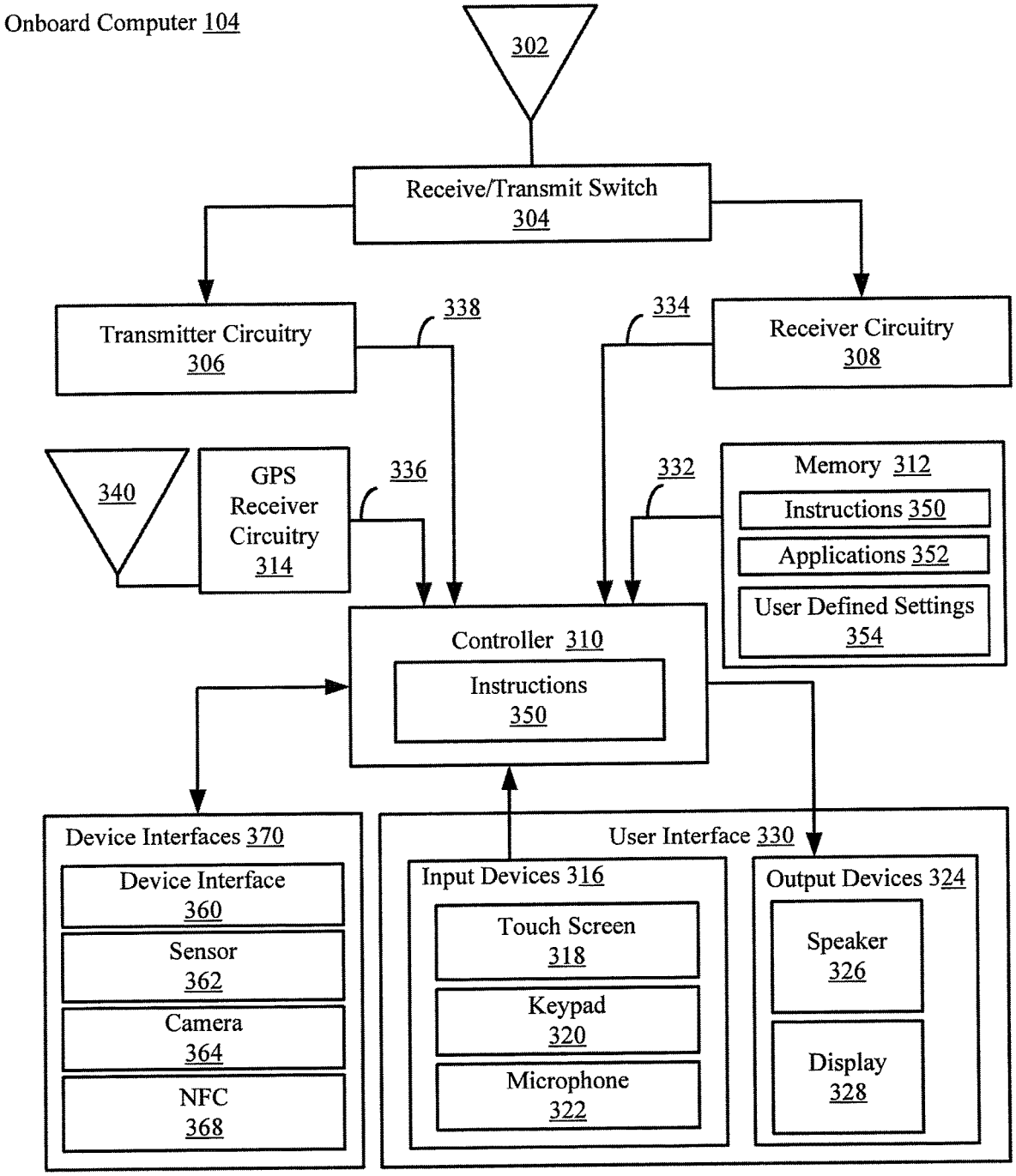
FIG. 3 is a block diagram of an exemplary automotive device.

Referring now to FIG. 3, there is a more detailed block diagram of the onboard computer. The onboard computer 104 will be described herein as comprising an in-dash computer 104, such as may be incorporated in a vehicle, also commonly referred to as a "head unit", and may be implemented alone or in association with a video/dvd player, GPS unit, stereo unit, or the like. However, the disclosed embodiments are not limited in this regard. For example, the onboard computer 104 can alternatively comprise a notebook, a laptop computer, a PDA, a tablet computer, a portable navigation device, or other device, and may be located anywhere within vehicle 102.

Notably, the onboard computer 104 can include more or less components than those shown in FIG. 3. For example, the onboard computer 104 can include a wired system interface, such as a universal serial bus interface (not depicted). However, the components shown are sufficient to disclose an illustrative embodiment implementing the present invention. The hardware architecture of FIG. 3 represents one embodiment of a representative communication device configured to facilitate the monitor and report the road quality experienced by vehicle 102. In this regard, the onboard computer of FIG. 3 implements methods for monitoring and reporting road quality experienced by vehicle 102. Exemplary embodiments of said methods will be described below in relation to FIGS. 5-6.

As shown in FIG. 3, the onboard computer 104 may include a receive/transmit (Rx/Tx) switch 304 to selectively couple the antenna 302 to the transmitter circuitry 306 and receiver circuitry 308 in a manner familiar to those skilled in the art. The receiver circuitry 308 demodulates and decodes the RF signals received from any components connected to the onboard computer 104 through a wireless connection (e.g. wireless connection 250 of FIG. 2). The receiver circuitry 308 is coupled to a controller 310 via an electrical connection 334. The receiver circuitry 308 provides the decoded RF signal information to the controller 310. The controller 310 uses the decoded RF signal information in accordance with the function(s) of the onboard computer 104. For example, if the RF signals include identifier information and/or location information for other communication devices (e.g., devices 204-207 of FIG. 2), then the identifier and/or location information can be used by the controller 310 to identify other devices that are pre-defined distances from or within range of the onboard computer 104. The controller 310 also provides information to the transmitter circuitry 306 for encoding and modulating information into RF signals. Accordingly, the controller 310 is coupled to the transmitter circuitry 306 via an electrical connection 338. The transmitter circuitry 306 communicates the RF signals to the antenna 302 for transmission to an external device (e.g., network equipment of network 104 of FIG. 1).

An antenna 340 is coupled to GPS receiver circuitry 314 for receiving GPS signals. The GPS receiver circuitry 314 demodulates and decodes the GPS signals to extract GPS location information therefrom. The GPS location information indicates the location of the vehicle 102. The GPS receiver circuitry 314 provides the decoded GPS location information to the controller 310. As such, the GPS receiver circuitry 314 is coupled to the controller 310 via an electrical connection 336. Notably, the present invention is not limited to GPS based methods for determining a location of the vehicle 102. Other methods for determining a location of a communication device may be used with the present invention without limitation.

The controller 310 uses the decoded GPS location information in accordance with the function(s) of the onboard computer 104. For example, the GPS location information and/or other location information can be used to generate a geographic map showing the location of the vehicle 102. The GPS location information and/or other location information can further be used to determine the route the vehicle 102 is traveling.

The controller 310 stores the decoded RF signal information and the decoded GPS location information in a memory 312 of the onboard computer 104. Accordingly, the memory 312 is connected to and accessible by the controller 310 through an electrical connection 332. The memory 312 can be a volatile memory and/or a non-volatile memory. For example, the memory 312 can include, but is not limited to, a Random Access Memory (RAM), a Dynamic Random Access Memory (DRAM), a Static Random Access Memory (SRAM), Read-Only Memory (ROM) and flash memory. The memory 312 can also have stored therein the software applications 352 and user-defined settings 354.

The software applications 352 include, but are not limited to, applications operative to monitor various diagnostic sensors within the vehicle 102. At least one of the software applications 352 is operative to monitor and report road quality through processing of sensor, location, and other data to determine a road quality indication. At least one of the software applications 352 is also operative to transmit and/or receive various information to/from server 108.

The user-defined settings 354 comprise statements that define or constrain some operations of the vehicle 102 and/or the onboard computer 104.

As shown in FIG. 3, one or more sets of instructions 350 are stored in the memory 312. The instructions 350 can also reside, completely or at least partially, within the controller 310 during execution thereof by the onboard computer 104. In this regard, the memory 312 and the controller 310 can constitute machine-readable media. The term "machine-readable media", as used here, refers to a single medium or multiple media that store the one or more sets of instructions 350. The term "machine-readable media", as used here, also refers to any medium that is capable of storing, encoding or carrying the set of instructions 350 for execution by the onboard computer 104 and that cause the onboard computer 104 to perform one or more of the methodologies of the present disclosure.

The controller 310 is also connected to a user interface 330. The user interface 330 is comprised of input devices 316, output devices 324, and software routines (not shown in FIG. 2) configured to allow a user to interact with and control software applications 352 installed on the onboard computer 104. Such input and output devices respectively include, but are not limited to, a display 328, a speaker 326, a keypad 320, a directional pad (not shown in FIG. 2), a directional knob (not shown in FIG. 3), a microphone 322, a touch screen 318, and the like. In one implementation, the keypad 320, touch screen 318, or similar device may be employed to directly input which seats are occupied by which drivers.

The microphone 322 facilitates the capturing of sound (e.g. voice commands) and converting the captured sound into electrical signals. The electrical signals may be used by the onboard computer 104 interface with various applications 352.

Device interfaces 370 include various interfaces that allow the onboard computer 104 to interact with other devices and/or the environment in the vehicle 102. Device interfaces include a generic device interface 360 which may be any device interface including, but not limited to, a hardware interface, e.g. USB and IEEE 1394 variants, sensors 362, a camera 364 and a Radio Frequency Identification (RFID) reader or near field communication (NFC) transceiver 368, and the like. Embodiments of the present invention are not limited in this regard.

The sensors 362 may include, but are not limited to, vertical displacement sensors, motion sensors, an accelerometer, an altimeter, a velocity sensor and/or a gyroscope. Accelerometers, vertical displacement sensors, motion sensors, altimeters, velocity sensors and gyroscopes are well known in the art, and therefore will not be described herein. However, it should be understood that the sensor data generated by the sensors 362 may be used by the onboard computer 104 to determine an objective level of road quality.

Figure 4:
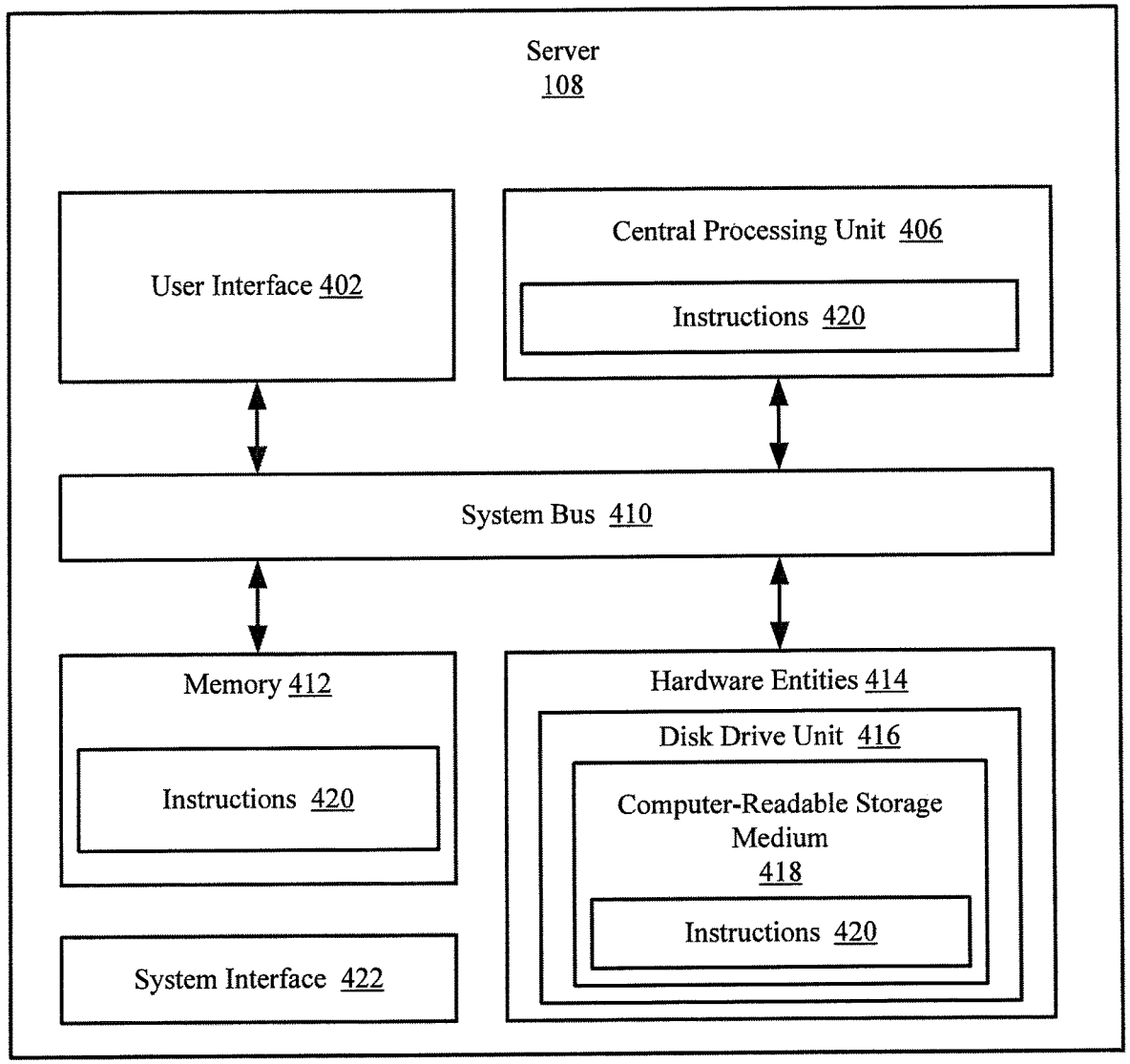
FIG. 4 is a block diagram of an exemplary communication device.

Referring now to FIG. 4, there is provided a more detailed block diagram of the server 108 of FIG. 1 that is useful for understanding the present invention. As shown in FIG. 4, the server 108 comprises a system interface 422, a user interface 402, a Central Processing Unit (CPU) 406, a system bus 410, a memory 412 connected to and accessible by other portions of server 108 through system bus 410, and hardware entities 414 connected to system bus 410. At least some of the hardware entities 414 perform actions involving access to and use of memory 312, which can be a Random Access Memory (RAM), a disk driver and/or a Compact Disc Read Only Memory (CD-ROM). Some or all of the listed components 402-422 can be implemented as hardware, software and/or a combination of hardware and software. The hardware includes, but is not limited to, an electronic circuit.

The server 108 may include more, less or different components than those illustrated in FIG. 4. However, the components shown are sufficient to disclose an illustrative embodiment implementing the present invention. The hardware architecture of FIG. 4 represents one embodiment of a representative server configured to facilitate the provision of automatic software function control services to a user of a communication device (e.g., onboard computer 104 of FIG. 1). As such, the server 108 includes an electronic circuit which implements a method for processing and aggregating road quality indication information from a plurality of vehicles as well as providing vehicles with information based on the road quality indications. Exemplary embodiments of said method will be described below in relation to FIG. 6.

Hardware entities 414 can include microprocessors, Application Specific Integrated Circuits (ASICs) and other hardware. Hardware entities 414 may include a microprocessor programmed for facilitating the provision of the automatic software function control services to a user of the communication device (e.g., onboard computer 104 of FIG. 1). In this regard, it should be understood that the microprocessor can access and run various software applications (not shown in FIG. 4) installed on the server 108. Such software applications include, but are not limited to, mapping software, road quality analysis software, and the like. The mapping software applications (not shown in FIG. 4) are operative to facilitate the provision of updated maps and navigation routes to a communication device (e.g., onboard computer 104 of FIG. 1) that take in to account the estimated road quality derived from the road quality indications received from the plurality of vehicles. The road quality indication analysis and processing applications are operative to facilitate the processing and aggregation of the various road quality indications and other information transmitted to server 108 from a communication device (e.g., onboard computer 104 of FIG. 1) and for the provision of updated road quality indication algorithm to a communication device (e.g., onboard computer 104 of FIG. 1).

As shown in FIG. 4, the hardware entities 414 can include a disk drive unit 416 comprising a computer-readable storage medium 418 on which is stored one or more sets of instructions 420 (e.g., software code or code sections) configured to implement one or more of the methodologies, procedures, or functions described herein. The instructions 420 may also reside, completely or at least partially, within the memory 412 and/or within the CPU 406 during execution thereof by the server 108. The memory 412 and the CPU 406 also may constitute machine-readable media. The term "machine-readable media", as used here, refers to a single medium or multiple media (e.g., a centralized or distributed database, and/or associated caches and servers) that store the one or more sets of instructions 420. The term "machine-readable media", as used here, also refers to any non-transient medium that is capable of storing, encoding or carrying a set of instructions 420 for execution by the server 108 and that cause the server 108 to perform any one or more of the methodologies of the present disclosure.

System interface 422 allows the server 108 to communicate directly or indirectly with external communication devices (e.g., onboard computer 104 of FIG. 1). If the server 108 is communicating indirectly with the external communication device, then the server 108 is sending and receiving communications through a common network (e.g., network 104 of FIG. 1).

As noted above, the system 100 implements methods for monitoring, reporting, processing, and analyzing road quality information. Exemplary embodiments of such methods will now be described in relation to FIGS. 5-6.

Exemplary Methods

Figure 5:
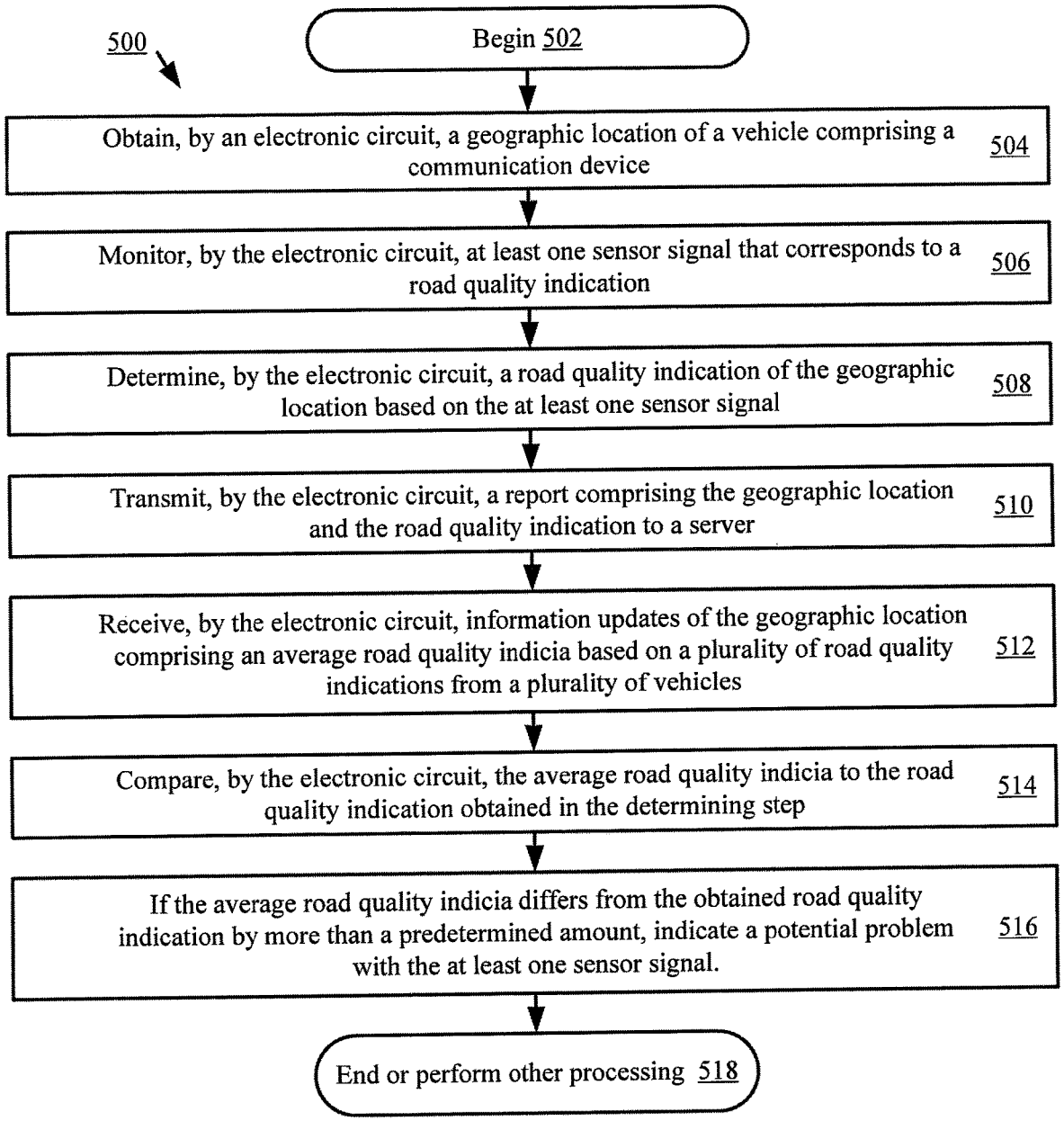
FIG. 5 is a flow diagram of an exemplary method for use in a communication device for monitoring and reporting road quality.

Referring now to FIG. 5, there is provided a flow diagram of an exemplary method 500 for monitoring and reporting road quality. The method 500 will be described in an automotive computing context but is not limited in this regard and the method could be used in conjunction with other types of transport. The method 500 is useful in other applications, such as mobile phone and smart phone applications, portable computer applications, PDA applications, portable navigation device applications, and any other application in which monitoring and reporting of road quality is desired. The method 500 will also be described in a GPS based context. The method 500 is also not limited in this regard. The method 500 is useful in other location based applications, such as reference coordinate system based location applications, radiological topographical survey based location applications, local microwave/sonar beacon/receiver based location applications, ultrasound ranging based location applications, laser ranging based location applications, and/or triangulation based location applications. Further, the method 500 will be described in reference to an electronic circuit, which may be present in any device capable of running any of the above mentioned applications.

As shown in FIG. 5, the method 500 begins with step 502 and continues with step 504. In step 504, an electronic circuit obtains a geographic location of a vehicle 102. In an implementation, the onboard computer 104, which includes the electronic circuit, computes a location estimate of the vehicle 102 using the GPS signals. The location estimate specifies an estimated geographic location of the vehicle 102 relative to Earth's surface. The estimated position may be a multidimensional estimated location, such as a two dimensional or three dimensional estimated location. Methods for computing position estimates using GPS signals are well known in the art, and therefore will not be described here. Any such method may be used in step 504 without limitation.

Upon completing step 504, step 506 is performed where the electronic circuit monitors at least one sensor signal that corresponds to a road quality indication. The sensor signal may be generated by any sensor monitoring vehicle systems relevant to a determination of road quality including, but not limited to, suspension sensors, shock sensors, strut sensors, and/or any other vertical displacement sensor. A horizontal displacement sensor may be used in an implementation to detect when a driver quickly swerves to avoid a road obstacle. In an implementation, the onboard computer 104 may monitor a signal generated by a sensor measuring activity of an active suspension system. In another implementation, the signal may be generated by a sensor connected to the shocks or struts of a conventional suspension system. In another implementation, the signal may be generated by a vertical displacement sensor included in the onboard computer 104. On skilled in the art will note that this last implementation would not require the onboard computer to be directly connected with any of the vehicle systems, nor would it require the vehicle to have sophisticated suspension systems and sensor networks. Regardless of where the sensor signal was generated, the data may then be used by the onboard computer 104 to judge the relative road quality of the road the vehicle 102 is traveling on as discussed in reference to step 508 below.

Upon completing step 506, step 508 is performed where the electronic circuit computes a road quality indication of the road the vehicle 102 is traveling on based on the sensor signal monitored in step 506. This determination may take into account a number of factors. For example, the onboard computer 104 may monitor and process a vertical displacement sensor somewhere in the vehicle 102, or a sensor attached to the struts or shock absorbers of a conventional suspension system, to arrive at an objective indication of road quality at the geographic road location of the vehicle 102. In an implementation, onboard computer 104 may have information concerning the vehicle's make and model or have information concerning the type of suspension system the vehicle utilizes and its condition. In this implementation, a vehicle with a sophisticated active suspension system may return significantly different signals than a vehicle with a convention suspension system. The onboard computer 104 may run an algorithm on the signal received based on the type of suspension system installed on vehicle 102 to arrive at a standardized or objective indication of road quality that is independent of the vehicle's suspension system.

Referring again to FIG. 5, the method 500 continues with step 510 where the electronic circuit transmits the geographic location and the road quality indication of the vehicle 102 to a server, e.g. server 108 of FIG. 1. In an implementation, the onboard computer compiles a report including, among other information, the geographic location and the road quality indication of the vehicle 102. The onboard computer 104, through transmitter circuitry 306 and antenna 302 shown in FIG. 3, transmits the report to server 108 through network 106, shown in FIG. 1. The report may include, but is not limited to, the geographic location of the vehicle 102, the route vehicle 102 is currently traveling, the road quality indication determined in step 508, the raw sensor data monitored in step 506, the make and model of the vehicle 102, and the like.

Upon completing step 510, step 512 is performed where the electronic circuit receives information updates that include average road quality indicia based on a plurality of road quality indications from a plurality of vehicles. In an implementation, the information updates contain averaged road quality indicia supplied from a table located on server 108. The onboard computer 104 may use this information to update the local mapping software with the latest road quality updates. Additionally, the information updates may contain updated algorithms (e.g. the algorithm used in step 508, above) that allow for the generation of more accurate road quality indications. The generation of the information updates is discussed in further detail in reference to FIG. 6 below.

Upon completing step 512, step 514 is performed where the electronic circuit compares the average road quality indicia to the road quality indication determined in step 508. This comparison may be a simple comparison of values. Alternatively, it may be a more sophisticated comparison involving an algorithm designed to detect problems with the local sensors located in vehicle 102. In an implementation, the onboard computer 104 may conduct a comparison of the road quality indication determined in step 508 with the average road quality indicia received from server 108 in step 512 using an algorithm designed to detect potential problems with the sensors, the onboard computer 104, or the algorithm used to determine the road quality indication.

Upon completing step 514, step 516 is performed where the electronic circuit analyzes the comparison conducted in step 514 to determine if the difference between the road quality indication and the average road quality indicia is more than a predetermined amount. If the difference is more than a predetermined amount, the onboard computer 104 indicates a potential problem with the at least one sensor signal. In an implementation, the indication is a visual or audio warning on the display of the onboard computer 104, shown in FIG. 3 as display 328. The indication may be of a sensor problem, a suspension system problem, a problem with the onboard computer 104, or the like. The predetermined amount may be set by the manufacturer or may be dynamically determined through the algorithms processed on the onboard computer 104 and/or server 108.

In an implementation, the electronic circuit may analyze the comparison conducted in step 514 to determine if the difference between the road quality indication and the average road quality indicia is such as to indicate that one or more signal sensor needs to be recalibrated. If so, the onboard computer 104 may then recalibrate the one or more signal sensor.

Various implementations of the methods allow for the steps to be executed in a different order. For example, one or more sensor may be monitored for determination of road quality prior to the onboard computer 104 obtaining and computing the geographic location. In another case, both sensor data and location data may be obtained on an ongoing, asynchronous basis, with the onboard computer's electronic circuit matching, or pairing up, sensor data to the nearest location data time-wise.

Upon completing step 516, step 518 is performed where the method 500 ends or other processing is performed.

Figure 6:
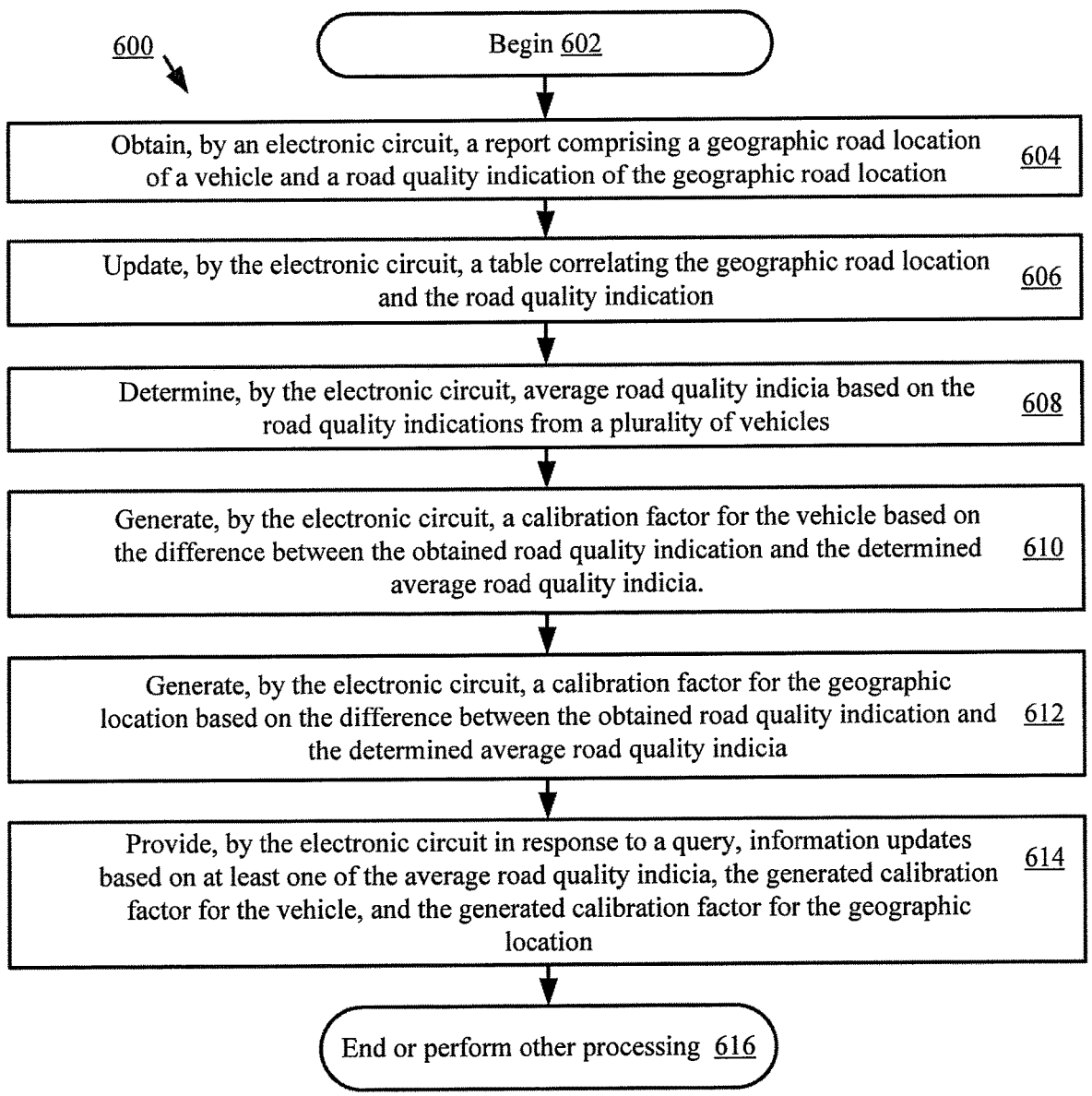
FIG. 6 is a flow diagram of an exemplary method for use in a server for monitoring and analyzing aggregate road quality indications

Referring now to FIG. 6, there is provided a flow diagram of a second exemplary method 600 for receiving and processing reported road quality for use in a server. The method 600 will be described in an automotive computing context.

The present invention is not limited in this regard. The method 600 will also be described in a GPS based context. The method 600 is also not limited in this regard.

As shown in FIG. 6, the method 600 begins with step 602 and continues with step 604. In step 604, an electronic circuit (e.g., a processor or other circuitry of server 108) obtains a geographic road location of a vehicle 102 and a road quality indication of the geographic road location. In an implementation, the geographic road location and the road quality indication is obtained through a report transmitted from an onboard computer 104 in vehicle 102. The report may include, but is not limited to the geographic location of the vehicle 102, the route vehicle 102 is currently traveling, the road quality indication determined in step 508, the raw sensor data monitored in step 506, the make and model of the vehicle 102, and the like.

Upon completing step 604, step 606 is performed where the electronic circuit updates a table correlating the geographic road location and the road quality indication. In an implementation, the server 108 obtains reports from a plurality of vehicles and populates a table with the date provided in the reports. As indicated above, these reports may include but are not limited to the geographic location of the reporting vehicle, the route the reporting vehicle is currently traveling, the road quality indication as determined by the reporting vehicle, the raw sensor data monitored by the reporting vehicle, the make and model of the reporting vehicle, and the like. This data is then populated into a database that includes at least a table correlating the geographic road location and the road quality indication reported by the vehicles.

Upon completing step 606, step 608 is performed where the electronic circuit determines average road quality indicia based on the road quality indications from a plurality of vehicles. In an implementation, the server 108 obtains road quality indications from a plurality of vehicles as detailed above. The server may aggregate the plurality of road quality indications into average road quality indicia for the geographic road location.

In various implementations, various algorithms in addition to a simple mean may be employed to determine average road quality indicia. For example, a mean may be calculated, with one or more road quality indications furthers from the mean removed from the calculation, and the average then calculated from the remaining road quality indications. In addition, the algorithms may calculate a weighted mean giving more weight to road quality indications coming from trusted and known sources than those coming from non trusted or unknown sources.

Upon completing step 608, step 610 and 612 are performed where the electronic circuit generates a calibration factor for the vehicle 102 and/or the geographic road location based on the difference between the road quality indication obtained in step 604 and the average road quality indicia determined in step 608. In an implementation, the server 108 may also include one or more processing algorithms for analyzing the information contained in the reports. In an implementation, an algorithm may be included that processes the information to provide further standardization of the road quality indication. For example, using the make and model information provided by the reports, the server 108 may be able to calibrate the data provided by particular makes and models to increase the accuracy of the road quality data. Alternatively, using data from multiple vehicles traveling the same route, the server 108 may be able to calibrate the data for a particular route to account for variations in road quality due to the route traveled by the vehicle. In this implementation, if a signification proportion of vehicles traveling a particular route experience significantly better or worse road quality than the rest of the vehicles traveling the same route, the server 108 may determine that one lane of the route has significantly better or worse road quality than the other lane of the same route. The server 108 may also use data received by the server from other sources, including but not limited to, a map database, an vehicle database, and any other database containing publically available information. The implementations of the present invention are not limited in this regard. Server 108 may use the road quality information in generating routes or other navigation information to send to vehicles 102 and/or other requesting entities.

Upon completing step 610 and/or 612, step 614 is performed where the electronic circuit provides, in response to a query, information updates based on at least one of the average road quality indicia, the generated calibration factor for the vehicle, and the generated calibration factor for the geographic location. In an implementation, the information updates may be provided to a vehicle 102 requesting the information update via network 106 as shown on FIG. 1. The information update may include, but is not limited to, average road quality indicia of the route the vehicle 102 is traveling, updated road quality indication algorithms that allow for more accurate generation of future road quality indications by the onboard computer of vehicle 102, updated maps and navigation routes, and the like. In an implementation, the information update is generated by server 108 based on the information reports received from multiple vehicles in step 604. Alternatively, the information update may be generated by server 108 using only the information report from vehicle 102, along with other publically available information including, but not limited to, map information, vehicle manufacturer information, and the like.

The method 600 then continues to step 616 where method 600 ends or other processing is performed.

In various implementations, the methods described above may be implemented in systems and devices which include non-transient computer-readable media. Such systems may include at least one electronic circuit configured to perform the methods described above. Devices which include non-transient computer readable media may also include computer programs having a number of code sections. These code sections may be executable by a computer to cause the computer to perform the methods described above.

All of the apparatus, methods and algorithms disclosed and claimed herein can be made and executed without undue experimentation in light of the present disclosure. While example embodiments have been shown, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

I claim:

1. A method in a communication device equipped with an electronic circuit, the method comprising:
   obtaining, by the electronic circuit, a geographic location of a vehicle in which the communication device operates;

monitoring, by the electronic circuit, at least one sensor signal that corresponds to road quality;

determining, by the electronic circuit, a road quality indication of the geographic location based on the at least one sensor signal;

transmitting, by the electronic circuit, the geographic location and the road quality indication to a server; and determining, using an information received from the server, whether the road quality indication differs from an average road quality indicia for the geographic location.

2. The method of claim 1, further comprising:
providing a warning regarding a potential problem with the at least one sensor signal is provided via a user interface, based on the determining.

3. The method of claim 1, further comprising:
transmitting, by the electronic circuit, a query requesting an information update based on at least one of:
the road quality indication,
a calibration factor for the vehicle, or
a calibration factor for the geographic location.

4. The method of claim 3, further comprising:
receiving, by the electronic circuit in response to the query, an average road quality indicia for a route the vehicle is travelling.

5. The method of claim 3, further comprising:
receiving, by the electronic circuit in response to the query, an updated road indication algorithm for executing by the electronic circuit to generate a road quality indication.

6. The method of claim 3, further comprising:
receiving, by the electronic circuit in response to the query, an updated map.

7. The method of claim 3, further comprising:
receiving, by the electronic circuit in response to the query, an updated navigation route.

8. The method of claim 1, wherein determining the road quality indication includes determining the road quality indication in view of a make and a model of the vehicle.

9. The method of claim 1, wherein determining the road quality indication includes determining the road quality indication in view of a type of suspension with which the vehicle is equipped.

10. The method of claim 1, wherein the monitoring the at least one sensor signal includes receives a respective signal from at least one of: (i) a suspension sensor, (ii) a strut sensor, (iii) a shock sensor, (iv) a horizontal displacement sensor, or (v) a vertical displacement sensor.

11. A device comprising an electronic circuit and a non-transitory computer-readable storage medium having stored thereon a computer program for analyzing road quality information, the computer program configured to perform the steps of:
obtaining a geographic location of a vehicle in which the communication device operates, monitoring at least one sensor signal that corresponds to road quality, determining a road quality indication of the geographic location based on the at least one sensor signal, transmitting the geographic location and the road quality indication to a server, and determining, using an information received from the server, whether the road quality indication differs from an average road quality indicia for the geographic location.

12. The device of claim 11, the computer program further configured to perform the steps of:
providing a warning regarding a potential problem with the at least one sensor signal is provided via a user interface, based on the determining.

13. The device of claim 11, the computer program further configured to perform the steps of:
transmitting, by the electronic circuit, a query requesting an information update based on at least one of:
the road quality indication,
a calibration factor for the vehicle, or
a calibration factor for the geographic location.

14. The device of claim 13, the computer program further configured to perform the steps of:
receiving, by the electronic circuit in response to the query, an average road quality indicia for a route the vehicle is travelling.

15. The device of claim 13, the computer program further configured to perform the steps of:
receiving, by the electronic circuit in response to the query, an updated road indication algorithm for executing by the electronic circuit to generate a road quality indication.

16. The device of claim 13, the computer program further configured to perform the steps of:
receiving, by the electronic circuit in response to the query, an updated map.

17. The device of claim 13, the computer program further configured to perform the steps of:
receiving, by the electronic circuit in response to the query, an updated navigation route.

18. The device of claim 11, wherein determining the road quality indication includes determining the road quality indication in view of a make and a model of the vehicle.

19. The device of claim 11, wherein determining the road quality indication includes determining the road quality indication in view of a type of suspension with which the vehicle is equipped.

20. The device of claim 11, wherein the monitoring the at least one sensor signal includes receives a respective signal from at least one of: (i) a suspension sensor, (ii) a strut sensor, (iii) a shock sensor, (iv) a horizontal displacement sensor, or (v) a vertical displacement sensor.

* * * * *